July 7, 1970  D. HAFFER  3,519,289

SOUNDPROOF PIPE CONNECTION

Filed Feb. 5, 1969  4 Sheets-Sheet 1

Inventor:
DIETER HAFFER

By Michael S. Striker
Attorney

July 7, 1970  D. HAFFER  3,519,289
SOUNDPROOF PIPE CONNECTION
Filed Feb. 5, 1969  4 Sheets-Sheet 2
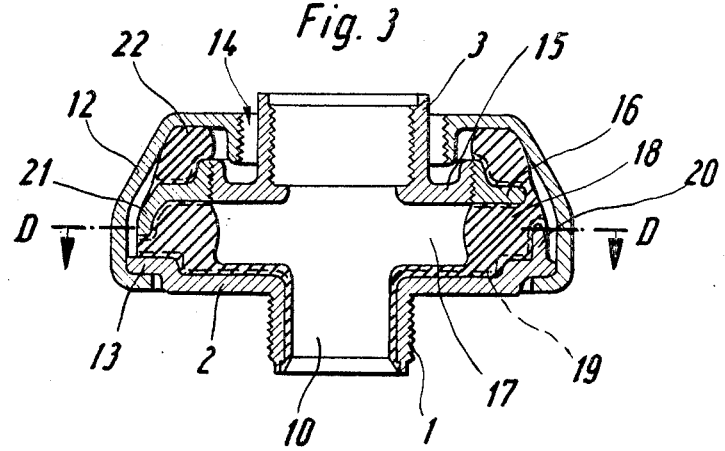
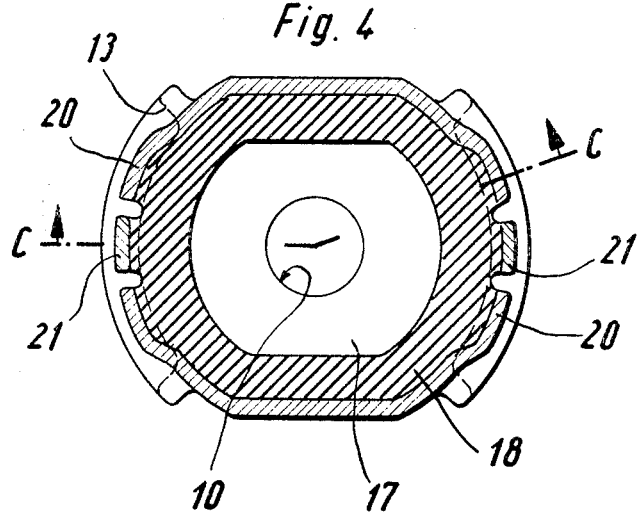
Inventor:
DIETER HAFFER
By Michael S. Striker
Attorney July 7, 1970　　　D. HAFFER　　　3,519,289
SOUNDPROOF PIPE CONNECTION
Filed Feb. 5, 1969　　　　　　　　　4 Sheets-Sheet 4

Inventor:
DIETER HAFFER
By Michael S. Striker
Attorney

United States Patent Office 3,519,289
Patented July 7, 1970

3,519,289
SOUNDPROOF PIPE CONNECTION
Dieter Haffer, Vallendar, Germany, assignor to Gesellschaft fur Technischen Fortschritt M.b.H., Hohr-Grenzhausen, Germany
Filed Feb. 5, 1969, Ser. No. 796,750
Claims priority, application Germany, Feb. 8, 1968, 1,675,302; Feb. 9, 1968, 1,675,303
Int. Cl. F16l 59/16
U.S. Cl. 285—49         16 Claims

ABSTRACT OF THE DISCLOSURE

An end portion of a first pipe section is adjacent to but spaced from the end portion of a second pipe section. A cap is connected to one of the pipe sections and surrounds with clearance the other pipe section. A flange provided on one of the pipe sections subdivides the clearance into two spaces. A body of elastic self-damping material is interposed between these end portions and connected thereto, being provided with a bore communicating with the bores of the pipe sections. An annulus of elastic material is located in the other space and is bonded to the flange.

BACKGROUND OF THE INVENTION

The present invention relates to pipe connections in general, and more specifically to an improved soundproof pipe connection. Still more particularly the invention relates to an improved soundproof pipe connection which may be used in sanitary installations to form a joint between two rigid or flexible conduits, an armature, as a connector between a water line and a nozzle or faucet, and for analogous applications.

The soundproof pipe connections known from the prior art utilize a soundproofing insert of elastic material. They suffer, however, from various drawbacks, including excessive bulky size, expensive construction, constructions which are insufficiently resistant to bending, to torsional or tensional stresses, unsatisfactory soundproofing effects, transmission of excessive forces to the soundproofing insert, and other problems.

SUMMARY OF THE INVENTION

It is a general object of the present invention to provide an improved soundproof pipe connection of the type here under discussion.

More particularly, it is an object of the present invention to provide a soundproof connection of the type in question which is very rugged and wherein the soundproofing insert is guarded against damage from forces transmitted to it.

A concomitant object of the invention is to provide such a soundproof pipe connection wherein the soundproofing effect is further improved.

Still another additional object of the invention is to provide a soundproof pipe connection which is absolutely tight.

In pursuance of the above objects, and others which will become apparent hereafter, one feature of my invention resides in the provision of a pipe connection wherein a pair of pipe sections have mutually spaced but adjacent end portions one of which is provided with an annular flange. A cap is provided constituting a coupling member and being connected to one of the pipe sections. This cap surrounds the other pipe section with clearance and defines a small gap with the annular flange. It further defines at the opposite axial sides of this flange a first and a second annular space.

A soundproofing member of highly self-damping elastic material is located in the first space and extends from one to the other of the end portions, having opposite terminal portions each of which is bonded to one of the end portions of the respective pipe section. A bore is provided in the soundproofing member which communicates with the bores of the pipe sections. Finally, an annulus of elastic material is located in the second space between the cap and the flange and is bonded to the latter.

With this construction I obtain pretensioning of the soundproofing member without any necessity for establishing a metallic contact between the cap and the other of the pipe sections, and this pretensioning is desirable to counteract the internal pressure in the bore of the soundproofing member.

I prefer to have the diameter of the annular flange be approximately double that of the pipe sections because this makes it possible to provide a larger connecting surface for the elastic material.

In accordance with a further concept of my invention, I am able to improve the soundproofing qualities of the novel pipe construction if I increase the internal diameter of the flow passage within the connection, and to this end I may make the annular flange of two parts, that is an annular outer part and an inner part surrounded by the outer part. In this construction I bond the outer part of the elastic material of the soundproofing member whereas the inner flange part is subsequently connected in pressure-tight manner with the pipe section on which the annular flange is provided. This makes it possible to increase the inner free diameter of the bore in the soundproofing member to the joint between the inner and outer flange sections.

As already pointed out, it is desirable to make the pipe connection as small as possible. Resort to the construction just mentioned above, wherein the inner free diameter of the bore is increased in the manner described, necessitates that either the outer diameter of the soundproofing body be increased if the wall thickness is to remain unchanged, or that the wall thickness be decreased if the outer diameter is to be maintained unchanged. Because of the desirability of keeping the bulk of the construction as small as possible, the latter possibility is preferred. However, to make this possible without weakening the reduced wall still further by rotation-preventing means which prevents rotation of the two pipe sections relative to one another and which extends from the respective end portions to the material of the soundproofing member, it is necessary that the rotation-preventing means require the smallest possible space. In accordance with the present invention, this is accomplished by having the rotation-preventing means located outside the material of the soundproofing body, contrary to what is known in the art.

Tests undertaken with pipe connections of the type here under discussion have shown that the soundproofing effect is the greater, the higher the capability of the soundproofing member to yield. However, the possibility of making the soundproofing material more yieldable is limited by the fact that, as the wall thickness of the soundproofing member is decreased, the danger of tearing thereof is increased. On the other hand, these tests have shown that it is possible to achieve the desired purpose by providing in the soundproofing member an annular recess surrounding and substantially coaxial with the bore in the soundproofing member, so that the bore is surrounded by a tubular inner wall which is relatively thin, and by an outer wall and the two being spaced by the annular recess. In such a construction the desired effect is obtained without incurring the aforementioned danger because, when pressure develops in the bore, the inner wall will be deflected on that side where the pressure acts, across the annular recess into abutment with the outer wall, thereby closing the recess and providing for reinforcement of the inner wall. This makes possible a construction having the desired characteristic, particularly in use of the thus-constructed novel pipe connection in water conduits whose interior pressure generally is on the order of approximately 3-6 atmospheres.

In accordance with a further concept of the invention, a construction of the type just mentioned may be provided with a pressure-tight safety closure closing the annular recess and assuring absolute tightness of the pipe connection. In this latter construction the danger of tearing or breaking is significantly reduced further because the annular recess may be larger on account of the safety closure incorporated, and because the annular recess is larger, the thickness of the inner wall may be increased without a reduction in the ability of the inner wall to yield, which ability is for instance measured in cm.³/atm.

Generally speaking, the provision of the annular recess makes for an improved expansion possibility which, even in the presence of higher internal pressures, provides a good soundproofing effect.

Other concepts of the invention will become apparent hereafter from the detailed description of the preferred embodiments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 illustrates a further embodiment of my invention in a view similar to FIG. 1 but taken on the line C—C of FIG. 4;

FIG. 4 is a view similar to FIG. 2 but taken on the line D—D of the embodiment illustrated in FIG. 3;

DESCRIPTION OF THE PREFERRED EMBODIMENTS

Figure 1:
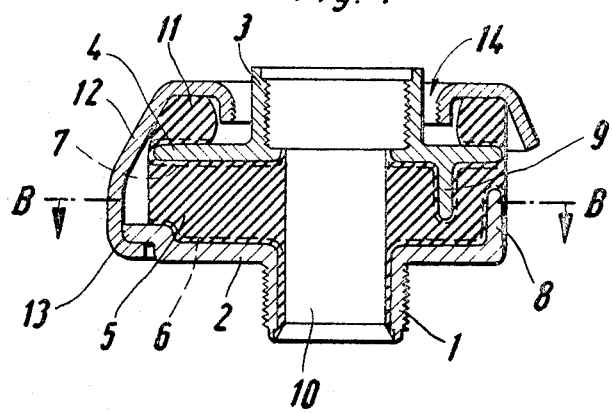
FIG. 1 is a longitudinal section through a pipe connection embodying my invention, taken on the line A—A of FIG. 2.
Figure 2:
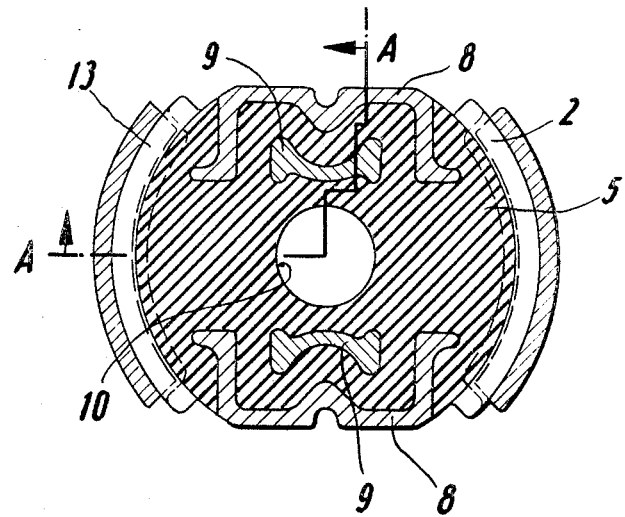
FIG. 2 is a view taken on the line B—B of FIG. 1.

Discussing now the drawing in detail, and firstly FIGS. 1 and 2 thereof, it will be seen that my novel pipe connection comprises two pipe sections 1 and 3, respectively. The pipe section 1 is provided with a radially extending flange 2 which is of one piece therewith. The pipe section 3 is similarly provided with a radially extending annular flange 4 which in the illustrated embodiment is also of one piece with the pipe section 3. An elastic body or member 5 of highly self-damping material is located intermediate the flanges 2 and 4 and connected with the respective contact surfaces of the flanges 2 and 4 in bonded relationship along the interfaces 6 and 7, respectively. These connections along the interfaces 6 and 7 are illustrated in broken lines.

The body 5 is provided with a flow passage 10 communicating with the bores of the pipe sections 1 and 3, respectively. It will be appreciated that the flow passage 10 may also be thought of as a bore.

In accordance with the invention, an elastic annulus 11 is located intermediate the flange 4 and a cap 12 which constitutes a connecting means between the pipe sections 1 and 3. The cap 12 is connected with the pipe section 1 in the illustrated embodiment of FIGS. 1 and 2 and surrounds the pipe section 3 with spacing and defines with the flange 4 a small gap. At opposite sides of the flange 4 there are created two spaces by provision of the cap 12, and in one of these spaces the body 5 where it is located. In the other of these spaces, the elastic annulus 11 is located and in accordance with the invention, this annulus 11 is bonded only to the flange 4 but not to the cap 12 and not to the remainder of the pipe section 3. The connection between the cap 12 and the flange 2 of the pipe section 1 is here illustrated as a bayonet-type closure 13, and the fact that the cap is not in engagement with the pipe section 3 is indicated by the cap 14 existing between the cap and the pipe section 3.

It is necessary to prevent rotation of the pipe sections 1 and 3 with reference to one another. For this purpose the flange 2 is provided with projecting ribs 8 which project towards the flange 4, and conversely the latter is provided with projecting ribs 9 which project toward the flange 2. In neither case do the ribs of one flange extend quite to the respectively other flange, as shown. They do, however, overlap in space and the material of the soundproofing body 5 is located between the ribs 8 and 9 so that, if a tendency to rotation of the pipe sections 1 and 3 relative to one another occurs, the material of the body 5 will be subjected to pressure with the result that it will preclude movement of the ribs 8 and 9 relative to one another and thereby will prevent the undesired rotation of the pipe sections with respect to each other. FIG. 2 shows that the ribs 8 are of substantially U-shaped outline and located diametrically opposite one another, and that the substantially C-shaped ribs 9 each are located within the opening of the associated U-shaped rib 8.

Coming now to the embodiment illustrated in FIGS. 3 and 4, it will be seen that this differs from that of FIGS. 1 and 2 in that the flange of the pipe section 3 is identified with reference numerals 15 and 16 and is of two-piece construction. More specifically, the flange of the pipe section 3 includes an inner annular portion 15 and an outer annular portion 16 surrounding the inner annular portion 15, as clearly shown in FIG. 3. The portions 15 and 16 are pressure tightly connected to one another, for instance by a threaded connection or the like and the inner flange section 15 is of one-piece construction with the remainder of the pipe setcion 3. In accordance with this embodiment only the outer flange section 16 is connected with the elastic material of the body constituting the sound-proofing member and with the elastic material of the annulus. Such connection may be by bonding, for instance by vulcanizing. The connection between the flange sections 15 and 16 is established only after the flange section 16 has been connected with the elastic material and this makes possible the provision of a hollow annular space 17 which constitutes an enlargement of the flow passage or bore 10 extending to the junction between the flange sections 15 and 16. In this embodiment the soundproofing body 5 and the elastic annulus 11 of FIGS. 1 and 2 have been replaced by a single member, designated by reference numeral 18. The lines of bonding of the elastic material of the member 18 to the flange section 16 and the flange 2 are designated by the broken-line showing of the interface 19.

Prevention of rotation of the pipe sections 1 and 3 relative to one another is accomplished in this embodiment by the rib 20 provided on the flange 2, and a corresponding rib 21 provided on the flange section 16. For purposes of clarity that portion of the body 18 which replaces the discrete annulus 11 of FIGS. 1 and 2 is identified in FIG. 3 with reference numeral 22; it will be seen that it is bonded only to the flange section 16. However, I wish to emphasize that it is entirely possible to construct the portion 22 as a discrete member rather than having it be of one piece with the remainder of the body 18 as illustrated. In this case also, however, the discrete member 22 would be bonded only to the flange section 16.

Figure 5:
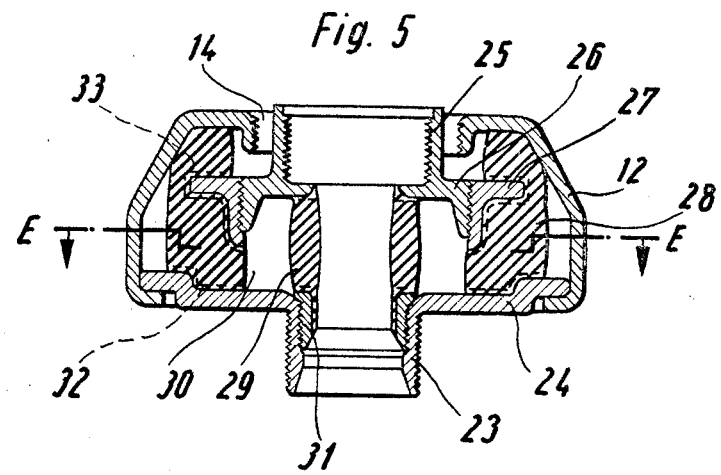
FIG. 5 is a view similar to FIG. 3 but illustrating the additional embodiment of the invention.

Coming now to the embodiment of FIG. 5, it will be seen that this resembles FIG. 1 but with the pipe sections respectively identified with reference numerals 23 and 25. The pipe sections 23 is provided with a flange 24 and the pipe section 25 with a flange 26. In analogy to the embodiment of FIGS. 3 and 4, the flange 26 consists of two pieces of which the outer is identified with reference numeral 27 and is connected to the inner in suitable manner, for instance by a threaded connection or the like. The cap is again identified with reference numeral 12 and surrounds the soundproofing body 28 of elastic material which is subdivided into two zones by the flange 27. In other words, in this embodiment also the discrete annulus 11 has been replaced by a portion of the body 28.

An annular recess 30 surrounds the flow passage in the body 28 and subdivides the body 28 into an inner hose-like or tubular wall 29 and the remaining outer portion of the soundproofing body, that is the portion identified with reference numeral 28. The wall 29 is respectively connected with the pipe sections 23 and 25. More specifically, one end of the inner wall 29 is bonded to the flange 26 of the pipe section 25, whereas the other end of the inner wall 29 is provided with a sleeve-like insert 31 which is bonded to it and which extends loosely but sealingly into the bore provided in the pipe section 23.

The lines along which the body 28 is bonded to the outer flange section 27 of the flange 26 are identified in broken lines with reference numeral 33; the interface at which the body 28 is bonded to the flange 24 of the pipe section 23 is identified in broken lines with reference numeral 32. The cap 14 is the same as in the preceding embodiments. The connection of the cap 12 is effected in suitable manner, for instance again in form of a bayonet-type closure and the cap 12 provides pretensioning for the body 28 in the desired manner and for the purposes set forth above.

Figure 6:
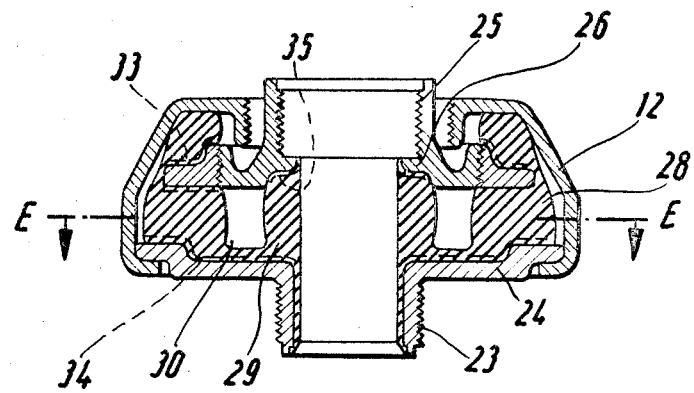
FIG. 6 is a view similar to FIG. 5 illustrating still another embodiment of the invention.

The embodiment illustrated in FIG. 6 differs from that of FIG. 5 insofar as the sleeve-like member 31 is omitted and the inner wall 29 is of one piece with the body 28 and so configurated that it can be bonded—for instance by vulcanizing—to the flange 24 as well as to a portion of the inner surface surrounding the bore of the pipe section 23, as illustrated by the fact that the interface along which this bonded connection occurs and which is identified with reference numeral 34 which turns into the interior of the bore of the pipe section 23. The bonded connection of the wall 29 at its other end to the flange 26 of the pipe section 25 is shown by the broken line 35.

Figure 8:
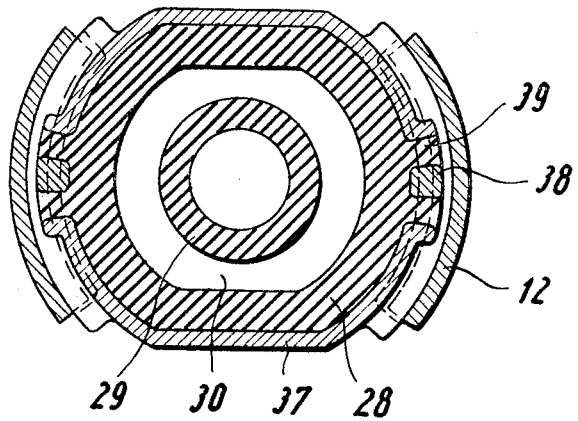
FIG. 8 is a section taken on the line E—E of FIG. 5.
Figure 7:
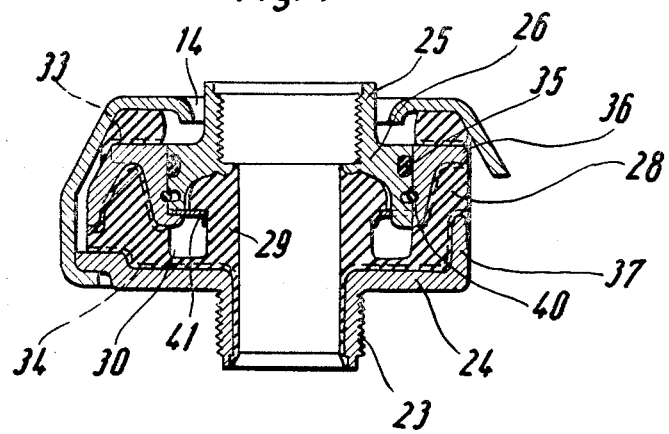
FIG. 7 is a view similar to FIG. 6 illustrating a further embodiment of the invention.

Coming, finally, to the embodiment illustrated in FIGS. 7 and 8, it will be seen that this is reminiscent of the embodiment of FIG. 6. Here, however, the inner wall 29 —which is again of one piece with the body 28—is configurated somewhat differently than in the embodiment of FIG. 6. It has, as clearly shown, a larger contact area in the region of its engagement with the flange 26 of the pipe section 25 and only abuts against the flange 26 without being bonded thereto as in the embodiment of FIG. 6. Advantageously, I provide means for preventing axial shifting of the wall 29 away from the flange 26, here illustrated as a supporting ring 41 which is secured between the inner section of the flange 26 and the outer flange section 36 surrounding this inner section, and which abuts against the radial protrusion provided on the inner as illustrated in FIG. 7. Means for preventing axial shifting of the outer flange section 36 with respect to the inner flange section of the flange 26 are here illustrated as being constituted by a conventional spring ring or circle 40 located in a suitable circumferential groove in the inner section and extending into a corresponding groove in the outer section 36. Furthermore, the inner section of the flange 26 is provided with an additional circumferential groove in which there is advantageously located an annular sealing member 35.

Rotation of the pipe sections 23 and 25 in the embodiment of FIGS. 7 and 8 is prevented by the upwardly extending peripheral ridge or edge 37 provided on the flange 24, and the abutment portions 38 (compare FIG. 8) provided on the outer flange portion of flange section 36. It is advantageous to locate an elastic buffer member 39 between the portions 37 and 38, as shown in FIG. 8. Alternately, a gap may be provided as shown in FIG. 4.

It will be understood that each of the elements described above, or two or more together, may also find a useful application in other types of constructions differing from the types described above.

While the invention has been illustrated and described as embodied in a soundproof pipe connection, it is not intended to be limited to the details shown, since various modifications and structural changes may be made without departing in any way from the spirit of the present invention.

What is claimed as new and desired to be protected by Letters Patent is set forth in the appended claims.

I claim:

1. A pipe connection comprising, in combination, a pair of pipe sections having mutually spaced but adjacent end portions one of which is provided with an annular flange; a cap constituting a coupling member connected to one of said pipe sections and surrounding with clearance the other pipe section and there being a small gap between said annular flange and said cap, said cap and the end portion adjacent the end portion having the flange defining at opposite axial sides of said flange a first and a second annular space, a soundproofing member of highly self-damping elastic material located in said first space extending from one to the other of said end portions and having oppostie terminal portions each bonded to one of said end portions, and a bore communicating with the bores of said pipe sections; and an annulus of elastic material located in said second space and extending between said cap and said flange being bonded only to the latter.

2. A pipe connection as defined in claim 1, said flange being provided on said end portion of said other pipe section.

3. A pipe connection as defined in claim 2, said flange having an outer diameter substantially equal to double the diameter of said pipe sections.

4. A pipe connection as defined in claim 1, each of said end portions comprising a set of projections extending toward but short of the other end portion and into the material of said soundproofing member.

5. A pipe connection as defined in claim 4, wherein said projections are elongated ribs projecting from the respective end portion by a distance substantially corresponding to two-thirds the distance between said end portions.

6. A pipe connectoin as defined in claim 5, the ribs of one set being disposed between the ribs of the other set and being separated therefrom by the material of said soundproofing member.

7. A pipe connection as defined in claim 1, said annular flange consisting of an inner flange section and an outer flange section which surrounds said inner flange section, and wherein said bore of said soundproofing member has a diameter substantially corresponding to that of said inner flange section.

8. A pipe connection as defined in claim 1, said pipe section and said cap consisting of metallic material.

9. A pipe connection as defined in claim 1; and further comprising rotation-limiting means provided on said pipe sections.

10. A pipe connection as defined in claim 9, said rotation-limiting means including limiting portions projecting from the respective pipe portions into said first space and overlapping one another, said limiting portions being normally spaced from each other but positioned so as to engage each other in response to rotational displacement of said pipe portions with reference to one another.

11. A pipe connection as defined in claim 1, wherein said soundproofing member and said annulus are of one piece with each other.

12. A pipe connection as defined in claim 11, further comprising an annular space provided in said soundproofing member extending from one to the other of said end sections surrounding said bore in said soundproofing member and having opposite pressure-tightly closed ends.

13. A pipe connection as defined in claim 12, said annular space being radially inwardly and outwardly bounded by elastic material, and being bounded at its ends by metallic material.

14. A pipe connection as defined in claim 13, comprising metallic sealing members bonded to said soundproofing member at the opposite ends of said annular space pressure-tightly closing the same.

15. A pipe connection as defined in claim 12, said annular space subdiving said soundproofing member into an annular outer portion and a tubular inner portion, and wherein said inner portion is pressure-tightly vulcanized to one and pressure-tightly adhesively bonded to the other of said pipe portions.

16. A pipe connection as defined in claim 12, said annular space subdividing said soundproofing member into an annular outer portion and a tubular inner portion having a flange-like radial bead at one axial end; further comprising a supporting ring located with said cap surrounding said inner portion spaced from but adjacent one of said end sections with said bead seal-tightly received between the latter and said ring; and connecting means rigidly and pressure-tightly connecting said ring and said one section with one another.

References Cited

UNITED STATES PATENTS 2,504,634  4/1950  Boschi _____ 285—49

FOREIGN PATENTS 108,761  10/1939  Australia.
1,283,622  11/1968  Germany.
93,449  3/1959  Norway.

DAVE W. AROLA, Primary Examiner

U.S. Cl. X.R.

181—33; 285—321, 347, 363